United States Patent
Haag et al.

(10) Patent No.: US 11,558,290 B2
(45) Date of Patent: Jan. 17, 2023

(54) OPERATION OF A BROADBAND ACCESS NETWORK OF A TELECOMMUNICATIONS NETWORK COMPRISING A PLURALITY OF CENTRAL OFFICE POINTS OF DELIVERY

(71) Applicant: Deutsche Telekom AG, Bonn (DE)

(72) Inventors: Thomas Haag, Rodgau (DE); Robert Soukup, Frankfurt am Main (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 17/407,217

(22) Filed: Aug. 20, 2021

(65) Prior Publication Data

US 2022/0060411 A1  Feb. 24, 2022

(30) Foreign Application Priority Data

Aug. 24, 2020 (EP) ..................... 20192343

(51) Int. Cl.
- *G06F 15/16* (2006.01)
- *H04L 45/48* (2022.01)
- *H04L 45/16* (2022.01)

(52) U.S. Cl.
CPC .............. *H04L 45/48* (2013.01); *H04L 45/16* (2013.01)

(58) Field of Classification Search
CPC . H04L 67/148; H04L 12/2856; H04L 47/125; H04L 12/2801
See application file for complete search history.

(56) References Cited

U.S. PATENT DOCUMENTS

| | | | | |
|---|---|---|---|---|
| 5,608,729 A | * | 3/1997 | Orsic | ...................... H04L 12/44 370/445 |
| 6,175,574 B1 | * | 1/2001 | Lewis | .................. H04Q 3/0025 370/522 |

(Continued)

FOREIGN PATENT DOCUMENTS

WO   WO-2018229059 A1 *  12/2018  ......... H04L 12/2856

OTHER PUBLICATIONS

Xincai Fei, et al., "Towards Load-Balanced VNF Assignment in Geo-distributed NFV Infrastructure", IEEE/ACM 25th International Symposium on Quality of Service (IWQOS), Jun. 14, 2017, pp. 1-10, IEEE, New York, USA, XP033114314.

(Continued)

*Primary Examiner* — Hieu T Hoang
(74) *Attorney, Agent, or Firm* — Leydig, Voit & Mayer, Ltd.

(57) ABSTRACT

A method for operation of a broadband access network of a telecommunications network includes: in a first step, a first access functionality primarily associated with a first central office point of delivery is also connected to a second central office point of delivery, and a second access functionality primarily associated with the second central office point of delivery is also connected to the first central office point of delivery; and in a second step, the cluster controller and both a first control functionality or control plane of the first central office point of delivery and a second control functionality or control plane of the second central office point of delivery control whether the first and second access functionalities are served by the first central office point of delivery or second central office point of delivery.

10 Claims, 4 Drawing Sheets

(56) References Cited

U.S. PATENT DOCUMENTS

| | | | | |
|---|---|---|---|---|
| 10,938,660 | B1* | 3/2021 | Kapur | H04L 41/0266 |
| 2004/0042469 | A1* | 3/2004 | Clark | H04L 45/36 |
| | | | | 370/401 |
| 2008/0224906 | A1* | 9/2008 | Plamondon | H03M 7/30 |
| | | | | 341/76 |
| 2010/0247098 | A1* | 9/2010 | Nesset | H04Q 11/0067 |
| | | | | 398/58 |
| 2014/0153573 | A1* | 6/2014 | Ramesh | H04L 45/748 |
| | | | | 370/392 |
| 2016/0013862 | A1* | 1/2016 | Zhang | H04L 41/0695 |
| | | | | 398/25 |
| 2016/0020939 | A1* | 1/2016 | Ramasubramanian | |
| | | | | H04L 41/40 |
| | | | | 370/217 |
| 2017/0288778 | A1* | 10/2017 | Shen | H04B 10/272 |
| 2017/0295130 | A1* | 10/2017 | Mahajan | H04L 67/568 |
| 2018/0302321 | A1* | 10/2018 | Manthiramoorthy | |
| | | | | H04L 49/1569 |
| 2020/0099546 | A1* | 3/2020 | Haag | H04Q 11/0478 |
| 2020/0213182 | A1* | 7/2020 | Hugar | H04L 12/4641 |
| 2020/0344146 | A1* | 10/2020 | Roberts | H04L 45/02 |
| 2020/0344158 | A1* | 10/2020 | Pianigiani | H04L 45/64 |
| 2021/0026678 | A1* | 1/2021 | Kottapalli | G06N 20/00 |
| 2021/0306285 | A1* | 9/2021 | Hirasawa | H04L 12/28 |

OTHER PUBLICATIONS

Saurav Das, et al., "CORD Fabric, Overlay Virtualization, and Service Composition", Cord Design Notes, Mar. 1, 2016, pp. 1-11, ONF, Menlo Park, USA, XP055382842.

Saurav Das, "CORD Fabric An Open-Source Leaf-Spine L3 Clos Fabric", ONF Operator Member Survey, Feb. 6, 2015, pp. 1-16, ONF, Menlo Park, USA, XP055382841.

Larry Peterson, et al., "Central Office Re-Architected as a Data Center", IEEE Communications Magazine, Oct. 1, 2016, pp. 96-101, IEEE, New York, USA, XP055399082.

* cited by examiner

OPERATION OF A BROADBAND ACCESS NETWORK OF A TELECOMMUNICATIONS NETWORK COMPRISING A PLURALITY OF CENTRAL OFFICE POINTS OF DELIVERY

CROSS-REFERENCE TO PRIOR APPLICATIONS

This application claims benefit to European Patent Application No. EP 20 192 343.0, filed on Aug. 24, 2020, which is hereby incorporated by reference herein.

FIELD

The present invention relates to a method for operation of a broadband access network of a telecommunications network comprising a plurality of central office points of delivery and/or for increased flexibility and/or resiliency within the telecommunications network and/or within or among the plurality of central office points of delivery, wherein each one of the plurality of central office points of delivery comprises a control functionality or control plane, a management functionality or management plane, a transport functionality or service, as well as an edge functionality or service, and has or is connected to an access functionality being realized via a plurality of access nodes that terminate physical subscriber lines serving end users of the telecommunications network.

Furthermore, the present invention relates to a broadband access network or telecommunications network for operation of a broadband access network of a telecommunications network comprising a plurality of central office points of delivery and/or for increased flexibility and/or resiliency within the telecommunications network and/or within or among the plurality of central office points of delivery, wherein each one of the plurality of central office points of delivery comprises a control functionality or control plane, a management functionality or management plane, a transport functionality or service, as well as an edge functionality or service, and has or is connected to an access functionality being realized via a plurality of access nodes that terminate physical subscriber lines serving end users of the telecommunications network.

Additionally, the present invention relates to a central office point of delivery cluster or a system comprising a central office point of delivery cluster for operation of a broadband access network of a telecommunications network comprising a plurality of central office points of delivery and/or for increased flexibility and/or resiliency within the telecommunications network and/or within or among the plurality of central office points of delivery, wherein each one of the plurality of central office points of delivery comprises a control functionality or control plane, a management functionality or management plane, a transport functionality or service, as well as an edge functionality or service, and has or is connected to an access functionality being realized via a plurality of access nodes that terminate physical subscriber lines serving end users of the telecommunications network.

Furthermore, the present invention relates to a program and a computer-readable medium for operation of a broadband access network of a telecommunications network comprising a plurality of central office points of delivery and/or for increased flexibility and/or resiliency within the telecommunications network and/or within or among the plurality of central office points of delivery.

BACKGROUND

The exchange of packetized information in broadband communication systems or telecommunications networks, both in fixed-line as in wireless communication systems (or fixed-line communication networks and mobile communication networks) has already grown dramatically and probably will also grow in the future due to the rapid spread of different data services in such communication networks.

In conventionally known architectures involving a plurality of central office points of delivery, such a plurality of central office points of delivery are designed for working self-contained. That means that each central office point of delivery is processed as one stand-alone entity or stand-alone central office point of delivery. This creates drawbacks regarding maintenance of central office points of delivery, regarding load-sharing, resiliency as well as providing services and/or service orchestration.

SUMMARY

In an exemplary embodiment, the present invention provides a method for operation of a broadband access network of a telecommunications network comprising a plurality of central office points of delivery and/or for increased flexibility and/or resiliency within the telecommunications network and/or within or among the plurality of central office points of delivery, wherein each one of the plurality of central office points of delivery comprises a control functionality or control plane, a management functionality or management plane, a transport functionality or service, as well as an edge functionality or service, and has or is connected to an access functionality realized via a plurality of access nodes that terminate physical subscriber lines serving end users of the telecommunications network, wherein at least a first central office point of delivery and a second central office point of delivery are related or combined or associated to form or to realize a central office point of delivery cluster, wherein the central office point of delivery cluster comprises or is associated or assigned to a cluster controller providing or comprising a cluster control functionality or cluster control plane, a cluster management functionality or cluster management plane, and a cluster transport functionality or service for the central office point of delivery cluster. The method comprises: in a first step, a first access functionality primarily associated with the first central office point of delivery is also connected to the second central office point of delivery, and a second access functionality primarily associated with the second central office point of delivery is also connected to the first central office point of delivery; and in a second step, the cluster controller and both a first control functionality or control plane of the first central office point of delivery and a second control functionality or control plane of the second central office point of delivery control whether the first and second access functionalities are served by the first central office point of delivery or second central office point of delivery.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
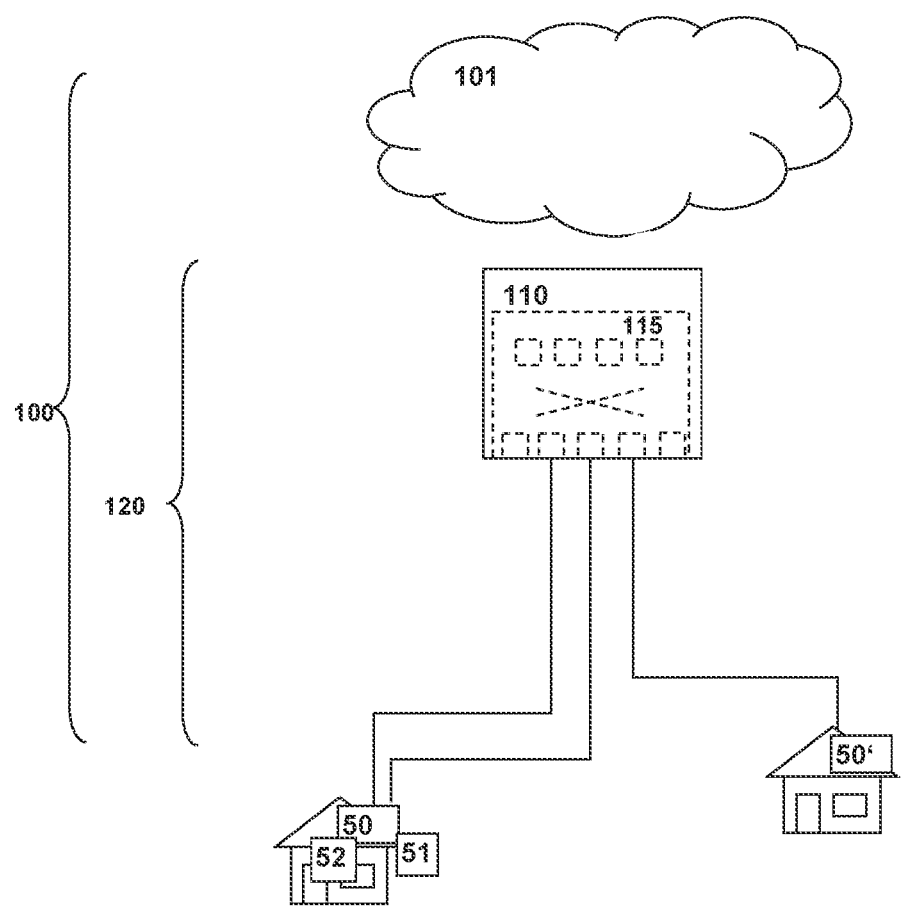
FIG. 1 schematically illustrates a telecommunications network according to the present invention, having a broadband access network with a central office point of delivery.

Exemplary embodiments of the present invention is to provide a technically simple, effective and cost effective solution for operation of a broadband access network of a telecommunications network comprising a plurality of central office points of delivery and/or for increased flexibility and/or resiliency within the telecommunications network and/or within or among the plurality of central office points of delivery, wherein each one of the plurality of central office points of delivery comprises a control functionality or control plane, a management functionality or management plane, a transport functionality or service, as well as an edge functionality or service, and has or is connected to an access functionality being realized via a plurality of access nodes that terminate physical subscriber lines serving end users of the telecommunications network. Exemplary embodiments of the present invention further provide a corresponding broadband access network or telecommunications network, a corresponding central office point of delivery cluster, and a corresponding system according to the present invention.

In an exemplary embodiment, the present invention provides a method for operation of a broadband access network of a telecommunications network comprising a plurality of central office points of delivery and/or for increased flexibility and/or resiliency within the telecommunications network and/or within or among the plurality of central office points of delivery, wherein each one of the plurality of central office points of delivery comprises a control functionality or control plane, a management functionality or management plane, a transport functionality or service, as well as an edge functionality or service, and has or is connected to an access functionality being realized via a plurality of access nodes that terminate physical subscriber lines serving end users of the telecommunications network, wherein at least a first central office point of delivery and a second central office point of delivery are related or combined or associated to form or to realize a central office point of delivery cluster, wherein the central office point of delivery cluster comprises or is associated or assigned to a cluster controller providing or comprising a cluster control functionality or cluster control plane, a cluster management functionality or cluster management plane, and a cluster transport functionality or service for the central office point of delivery cluster, wherein in order to more flexibly and/or more resiliently operate the access functionality associated with the central office point of delivery cluster, the method comprises the following steps:

in a first step, a first access functionality primarily associated with the first central office point of delivery is also connected to the second central office point of delivery, and a second access functionality primarily associated with the second central office point of delivery is also connected to the first central office point of delivery, in a second step, the cluster controller, and both a first control functionality or control plane of the first central office point of delivery, and a second control functionality or control plane of the second central office point of delivery control whether the first and second access functionality are served by the first or second central office point of delivery.

It is thereby advantageously possible according to the present invention to provide a solution such that a plurality of central office points of delivery are coupled within a cluster such as to enhance the capabilities of such a cluster of central office points of delivery. Within such a cluster of central office points of delivery, a centralized orchestrator (or the cluster controller) is able to control the plurality of central office points of delivery within the cluster, i.e. at least two central office points of delivery, the first and at least a second central office point of delivery. This is especially advantageous, in practice, in case of, e.g., big cities where a deployment or rollout strategy may be chosen with several central office points of delivery in a single central office location. According to the present invention, it is especially advantageous that software defined network principles are able to be used for coupling the control plane as well as the management plane between different central office points of delivery, especially allowing: dynamic in-service handover, e.g. for maintenance, service orchestration over more than one central office point of delivery for e.g. VPN (virtual private network) services, sharing of special service edges across different central office points of delivery (within the central office point of delivery cluster), load sharing and/or enhancing resiliency (e.g. via dual-homing access node entities).

Furthermore, it is advantageously possible, according to the present invention, that the cluster of central office points of delivery, i.e. the central office point of delivery cluster, is able to utilize more efficiently the uplink and downlink capacity towards and from the IP core, i.e. the backbone of the telecommunications network, i.e. in case that a communication service is requested that results in traffic, especially user plane traffic, between subscribers being connected to the telecommunications network via different central office points of delivery, this traffic necessarily needs to be routed using the IP core of the telecommunications network; in case both the respective central office points of delivery are part of a central office point of delivery cluster, such traffic is able to be routed locally within the central office point of delivery cluster.

According to the present invention, each one of the plurality of central office points of delivery comprises a control functionality or control plane, a management functionality or management plane, a transport functionality or service, as well as an edge functionality or service. Furthermore each one of the plurality of central office points of delivery has or is connected to an access functionality being realized via a plurality of access nodes that terminate physical subscriber lines serving end users of the telecommunications network. The central office point of delivery cluster comprises at least a first central office point of delivery and a second central office point of delivery which are related or combined or associated to form or to realize such a cluster. Of course, besides the first and second central office point of delivery, the central office point of delivery cluster may also comprise a third central office point of delivery, a fourth central office point of delivery, etc. However, in the context of the present description, it is primarily referred to a first and (at least) a second central office point of delivery. The central office point of delivery cluster comprises or is associated or assigned to a cluster controller providing or comprising a cluster control functionality or cluster control plane, a cluster management functionality or cluster management plane, and a cluster transport functionality or service for the central office point of delivery cluster.

One advantage of the use of a central office point of delivery cluster according to the present invention is to be able to provide a higher level of resilience and load balancing, especially with respect to access nodes connected to the individual central office points of delivery of a central office point of delivery cluster. Hence, according to the present invention—in order to more flexibly and/or more resiliently operate the access functionality associated with the central office point of delivery cluster—a method comprises the first step of a first access functionality (primarily associated with the first central office point of delivery) being also connected to the second central office point of delivery (or to another central office point of delivery in case that the central office point of delivery cluster comprises, e.g., three central office points of delivery), and a second access functionality (primarily associated with the second central office point of delivery) being also connected to the first central office point of delivery (or to another central office point of delivery of the cluster). In the second step, the cluster controller, and both a first control functionality or control plane of the first central office point of delivery, and a second control functionality or control plane of the second central office point of delivery control whether the first and second access functionality are served by the first or second central office point of delivery.

The telecommunications network according to the present invention may be a fixed-line telecommunications network or a mobile communication network but could also have both aspects, i.e. parts of a fixed-line telecommunications network (or being a fixed-line telecommunications network in such parts) and parts of a mobile communication network (or being a mobile communication network in such parts); such networks are also known under the term fixed-mobile-convergence networks (FMC networks).

According to the present invention, it is advantageously possible and preferred that in the second step, the cluster controller, and both the first control functionality or control plane, and the second control functionality or control plane provides resiliency and/or load sharing related to the first and second access functionality via steering activation and deactivation of sessions and/or ports related to the respective access nodes or physical subscriber lines, and/or provides session and/or service session mirroring from the first central office point of delivery to the second central office point of delivery and/or vice versa, and/or provides dynamic handover of a subscriber session from the first central office point of delivery to the second central office point of delivery and/or vice versa, and/or provides replacing the first central office point of delivery by the second central office point of delivery, or vice versa, especially in view of performing maintenance operations.

It is thereby advantageously possible according to the present invention that the telecommunications network and/or the broadband access network, and especially the plurality of central office points of delivery are able to be used more efficiently and more flexibly via grouping or clustering a first central office point of delivery and at least a second central office point of delivery into a central office point of delivery cluster.

According to a further preferred embodiment of the present invention, the cluster controller of the central office point of delivery cluster acts as a centralized orchestrator controlling at least the first and second central office point of delivery being part of the central office point of delivery cluster, wherein the central office point of delivery cluster appears as one single instance of a central office point of delivery to centralized functionalities or network nodes of the telecommunications network, especially a centralized management system thereof.

Thereby, it is advantageously possible to efficiently implement a method according to the present invention and to use the centralized orchestrator, which controls central office points of delivery belonging to a central office point of delivery cluster. To the centralized management system, the central office point of delivery cluster preferably appears as one single central office point of delivery instance.

According to a further embodiment of the present invention, each one of the plurality of central office points of delivery comprises a switching fabric as the transport functionality or service, the switching fabric comprising a plurality of spine network nodes and a plurality of leaf network nodes, the leaf network nodes especially providing the edge functionality or service,
wherein the line termination nodes of the respective access functionality are especially connected, respectively, to at least two leaf network nodes of the plurality of leaf network nodes within the respective central office point of delivery.

Thereby, it is advantageously possible to easily and efficiently implement a method according to an exemplary embodiment.

Furthermore, according to a preferred embodiment of the present invention, the central office point of delivery cluster, especially the cluster controller, provides for service orchestration involving both the first and the second central office point of delivery and/or for the sharing of special service edge nodes across at least the first and second central office point of delivery.

Thereby, it is advantageously possible to efficiently implement a method according to the present invention and to use it in case of realizing cluster-internal platform services: In this case, a delegation from application specific service slices from the central parts of the telecommunications network to the (central office point of delivery) cluster advantageously enables network efficient hub and spoke architectures as well as low latency services by reducing network routing. It is thereby advantageously possible to realize service instantiation on the level of the central office point of delivery cluster instead on a centralized level within the telecommunications network.

Furthermore, the present invention relates to a broadband access network or telecommunications network for operation of a broadband access network of a telecommunications network comprising a plurality of central office points of delivery and/or for increased flexibility and/or resiliency within the telecommunications network and/or within or among the plurality of central office points of delivery, wherein each one of the plurality of central office points of delivery comprises a control functionality or control plane, a management functionality or management plane, a transport functionality or service, as well as an edge functionality or service, and has or is connected to an access functionality being realized via a plurality of access nodes that terminate physical subscriber lines serving end users of the telecommunications network,
wherein at least a first central office point of delivery and a second central office point of delivery are related or combined or associated to form or to realize a central office point of delivery cluster, wherein the central office point of delivery cluster comprises or is associated or assigned to a cluster controller providing or comprising a cluster control functionality or cluster control plane, a cluster management functionality or cluster management plane, and a cluster transport functionality or service for the central office point of delivery cluster, wherein in order to more flexibly and/or more resiliently operate the access functionality associated with the central office point of delivery cluster, the broadband access network or telecommunications network is configured such that:

a first access functionality primarily associated with the first central office point of delivery is also connected to the second central office point of delivery, and a second access functionality primarily associated with the second central office point of delivery is also connected to the first central office point of delivery, the cluster controller, and both a first control functionality or control plane of the first central office point of delivery, and a second control functionality or control plane of the second central office point of delivery control whether the first and second access functionality are served by the first or second central office point of delivery.

Additionally, the present invention relates to a central office point of delivery cluster for operation of a broadband access network of a telecommunications network comprising a plurality of central office points of delivery and/or for increased flexibility and/or resiliency within the telecommunications network and/or within or among the plurality of central office points of delivery, wherein each one of the plurality of central office points of delivery comprises a control functionality or control plane, a management functionality or management plane, a transport functionality or service, as well as an edge functionality or service, and has or is connected to an access functionality being realized via a plurality of access nodes that terminate physical subscriber lines serving end users of the telecommunications network, wherein the central office point of delivery cluster comprises at least a first central office point of delivery and a second central office point of delivery, wherein the central office point of delivery cluster comprises or is associated or assigned to a cluster controller providing or comprising a cluster control functionality or cluster control plane, a cluster management functionality or cluster management plane, and a cluster transport functionality or service for the central office point of delivery cluster,
wherein in order to more flexibly and/or more resiliently operate the access functionality associated with the central office point of delivery cluster, the central office point of delivery cluster is configured such that:

a first access functionality primarily associated with the first central office point of delivery is also connected to the second central office point of delivery, and a second access functionality primarily associated with the second central office point of delivery is also connected to the first central office point of delivery, the cluster controller, and both a first control functionality or control plane of the first central office point of delivery, and a second control functionality or control plane of the second central office point of delivery control whether the first and second access functionality are served by the first or second central office point of delivery.

Additionally, the present invention relates to a system for operation of a broadband access network of a telecommunications network comprising a plurality of central office points of delivery and/or for increased flexibility and/or resiliency within the telecommunications network and/or within or among the plurality of central office points of delivery, wherein each one of the plurality of central office points of delivery comprises a control functionality or control plane, a management functionality or management plane, a transport functionality or service, as well as an edge functionality or service, and has or is connected to an access functionality being realized via a plurality of access nodes that terminate physical subscriber lines serving end users of the telecommunications network, wherein at least a first central office point of delivery and a second central office point of delivery are related or combined or associated to form or to realize a central office point of delivery cluster, wherein the central office point of delivery cluster comprises or is associated or assigned to a cluster controller providing or comprising a cluster control functionality or cluster control plane, a cluster management functionality or cluster management plane, and a cluster transport functionality or service for the central office point of delivery cluster, wherein in order to more flexibly and/or more resiliently operate the access functionality associated with the central office point of delivery cluster, the system is configured such that:

a first access functionality primarily associated with the first central office point of delivery is also connected to the second central office point of delivery, and a second access functionality primarily associated with the second central office point of delivery is also connected to the first central office point of delivery, the cluster controller, and both a first control functionality or control plane of the first central office point of delivery, and a second control functionality or control plane of the second central office point of delivery control whether the first and second access functionality are served by the first or second central office point of delivery.

Still additionally, the present invention relates to a program comprising a computer readable program code which, when executed on a computer and/or on a network node of a telecommunications network and/or on a cluster controller of a central office point of delivery cluster and/or on a control functionality or control plane or a management functionality or management plane of a central office point of delivery, or in part on the network node of a telecommunications network and/or in part on the cluster controller of a central office point of delivery cluster and/or in part on the control functionality or control plane or the management functionality or management plane of the central office point of delivery, causes the computer and/or the network node of the telecommunications network and/or the cluster controller of the central office point of delivery cluster and/or the control functionality or control plane or the management functionality or management plane of the central office point of delivery to perform a method according to an exemplary embodiment.

Furthermore, the present invention relates to a computer-readable medium comprising instructions which when executed on a computer and/or on a network node of a telecommunications network and/or on a cluster controller of a central office point of delivery cluster and/or on a control functionality or control plane or a management functionality or management plane of a central office point of delivery, or in part on the network node of a telecommunications network and/or in part on the cluster controller of a central office point of delivery cluster and/or in part on the control functionality or control plane or the management functionality or management plane of the central office point of delivery, causes the computer and/or the network node of the telecommunications network and/or the cluster controller of the central office point of delivery cluster and/or the control functionality or control plane or the management functionality or management plane of the central office point of delivery to perform a method according to an exemplary embodiment.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order; this is especially the case for the terms "first step", "second step", etc. It is to be understood that the terms so used are interchangeable under appropriate circumstances and that the embodiments of the invention described herein are capable of operation in other sequences than described or illustrated herein.

In FIG. 1, a telecommunications network 100 according to the present invention is schematically shown, having—preferably—at least a fixed line part. A mobile (or cellular) part may be present as well, as part of the telecommunications network 100. User equipment or client devices 51, 52 are connected to the telecommunications network 100 via a (broadband) access network 120. The telecommunications network 100 comprises, especially as part of the broadband access network 120, at least one logical or physical central office point of delivery 110 that is preferably realized within a (mini) data center and that is especially handling different access requirements, especially different access possibilities, of the client devices 51, 52 to network functionalities provided by the telecommunications network 100 or via the telecommunications network 100. In addition, the telecommunications network 100 typically also comprises—besides the broadband access network 120—a core network 101. The client devices 51, 52 are typically connected to the logical or physical central office point of delivery 110 via a customer premises equipment device 50, 50' or via a customer premises equipment functionality that may be built into or realized by the client devices 51, 52. Preferably but not necessarily, the central office point of delivery 110 comprises a switching fabric 115 comprising a plurality of spine network nodes and typically also a plurality of leaf network nodes.

Figure 2:
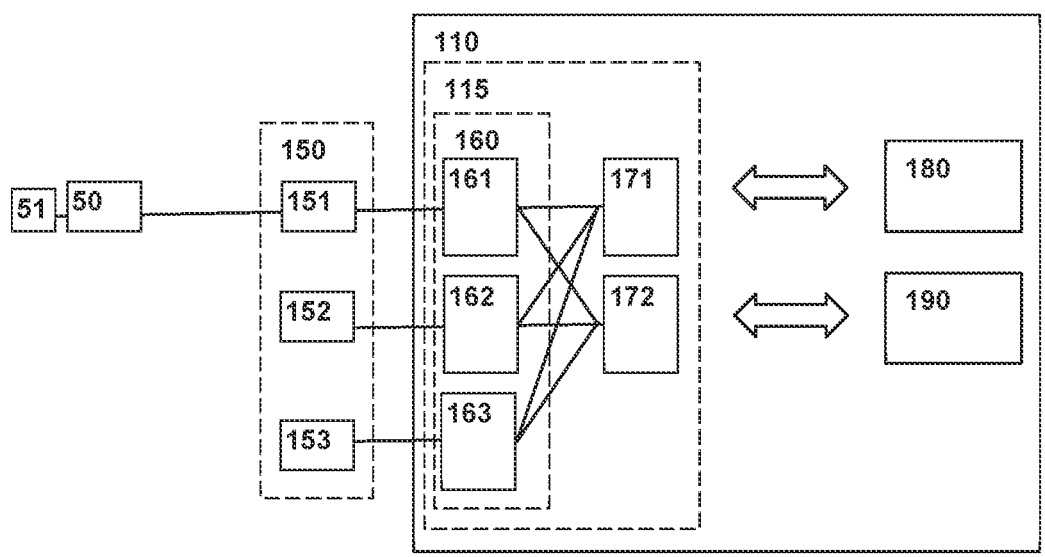
FIG. 2 schematically shows in greater detail one central office point of delivery comprising a certain number of components, entities and/or network nodes.

FIG. 2 schematically illustrates a central office point of delivery 110 as part of a broadband access network 120 of a telecommunications network 100, wherein the represented part of the telecommunications network 100 comprises—besides a control functionality or control plane 180, and a management functionality or management plane 190—a plurality of line termination nodes 151, 152, 153. In the example represented in FIG. 2, the broadband access network 120 comprises three line termination nodes, a first line termination node 151, a second line termination node 152, and a third line termination node 153. The line termination nodes 151, 152, 153 may be provided to support different access technologies to a home gateway or customer premises equipment or cable modem 50. In the exemplary embodiment shown in FIG. 2, the first line termination node 151 is taken, e.g., as a line termination node in the form of a hybrid fiber coaxial network equipment, supporting to be connected to a hybrid fiber coaxial network, typically comprising a plurality of (passive) coaxial infrastructure access points. In such a situation, a client device 51 (or a plurality of client devices) is (or are) connected to the telecommunications network 100 (i.e. to the first line termination node 151 or hybrid fiber coaxial network equipment) via the cable modem 50 (or customer premises equipment 50 or home gateway device 50). The functionality of the client device 51 and the functionality of the customer premises equipment 50 (or home gateway device 50 or cable modem 50) may be integrated in one device or "box". Nevertheless, these functionalities are represented in FIG. 2 as separated functionalities. In FIG. 2, only one cable modem device 50 (or customer premises equipment 50) (i.e. a specific customer premises equipment), and only one client device 51, and only one coaxial infrastructure access point 61 are shown. However, also the second and/or third line termination nodes 152, 153 may be realized as hybrid fiber coaxial network equipment, connected to corresponding coaxial infrastructure access points and cable modem devices. In the exemplary embodiment of the central office point of delivery 110 shown in FIG. 2, the pod 110 comprises a switching fabric 115 as a transport functionality or service 115 within the central office point of delivery 110. The switching fabric 115 (or transport functionality or service 115) comprises a plurality of spine network nodes 171, 172 and a plurality of leaf network nodes 161, 162, 163, the leaf network nodes 161, 162, 163 especially providing the edge functionality or service 160 within the central office point of delivery 110. The line termination nodes 151, 152, 153 of the respective access functionality 150 are especially connected, respectively, to at least two leaf network nodes of the plurality of leaf network nodes 161, 162, 163 within the central office point of delivery 110.

Figure 3:
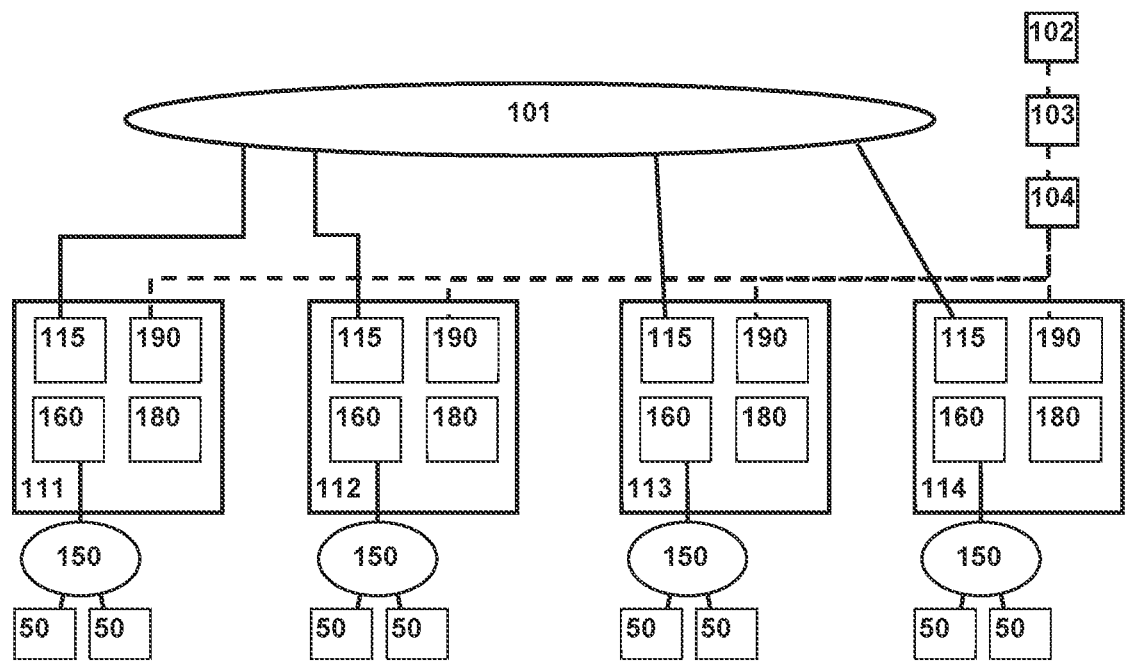
FIG. 3 schematically illustrates a telecommunications network comprising a plurality of central office points of delivery.

In FIG. 3, a telecommunications network 100 comprising a plurality of central office points of delivery is schematically shown. In FIG. 3, especially a first central office point of delivery 111, a second central office point of delivery 112, a third central office point of delivery 113, and a fourth central office point of delivery 114 are schematically shown, each comprising, respectively, a control functionality or control plane 180, a management functionality or management plane 190, a transport functionality or service 115, as well as an edge functionality or service 160, and each having or being, respectively, connected to an access functionality 150 (being typically realized via a plurality of access nodes that terminate physical subscriber lines serving end users (schematically indicated, in FIG. 3, via customer premises equipments 50) of the telecommunications network 100). The telecommunications network 100 comprise a core network 101, a business support system and/or operations support system or function or functionality 102 (BSS/OSS), a service management system or function or functionality 103, and a central management system or function or functionality 104. The core network 101 or backbone of the telecommunications network 100 is connected (using a data or internet protocol connection), respectively, to the transport functionality or service 115 of each of the central office points of delivery 111, 112, 113, 114. The business support system and/or operations support system 102, the service management system 103, and the central management system 104 are connected, respectively, to the management functionality or management plane 190 of each of the central office points of delivery 111, 112, 113, 114.

Figure 4:
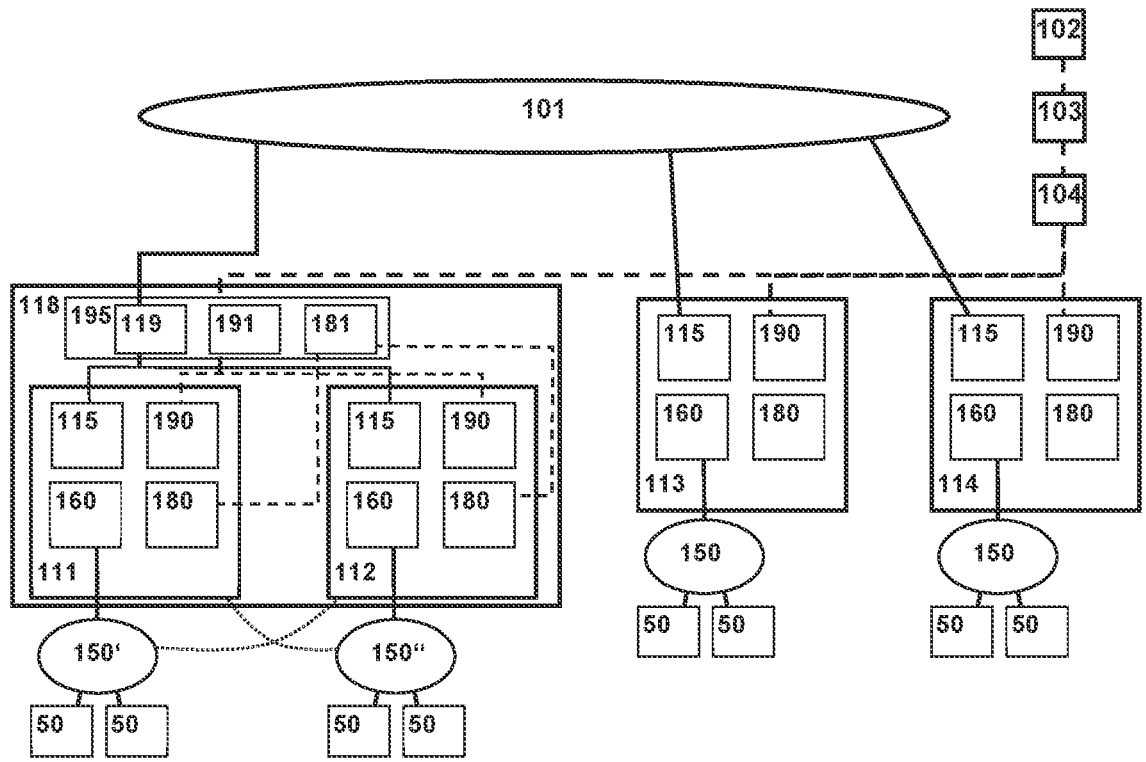
FIG. 4 schematically illustrates the telecommunications network as shown in FIG. 3, i.e. comprising a plurality of central office points of delivery, where two central office points of delivery are combined (or associated) in a central office point of delivery cluster.

In FIG. 4, the telecommunications network as shown in FIG. 3, i.e. comprising a plurality of central office points of delivery 111, 112, 113, 114 is schematically represented; however, in FIG. 4, two central office points of delivery are combined (or associated) in a central office point of delivery cluster 118. The central office point of delivery cluster 118 exemplarily shown in FIG. 4 comprises the first central office point of delivery 111 and the second central office point of delivery 112; however, additional central office points of delivery could be part of the central office point of delivery cluster 118 as well. However, for the sake of brevity and only exemplarily, the present description primarily refers to the case of the central office point of delivery cluster 118 having (or comprising) the first central office point of delivery 111 and the second central office point of delivery 112. Again, each one of the central office points of delivery 111, 112, 113, 114 shown in FIG. 4 comprise, respectively, the control functionality or control plane 180, the management functionality or management plane 190, the transport functionality or service 115, as well as the edge functionality or service 160, and each having or being, respectively, connected to the access functionality 150 in case of the third and fourth central office point of delivery 113, 114, and to a first access functionality 150' in case of the first central office point of delivery 111, and a second access functionality 150" in case of the second central office point of delivery 112. Again, the telecommunications network 100 comprises the core network 101, the business support system and/or operations support system or function or functionality 102 (BSS/OSS), the service management system or function or functionality 103, and the central management system or function or functionality 104. The central office point of delivery cluster 118 comprises or is associated or assigned to a cluster controller 195 providing or comprising a cluster control functionality or cluster control plane 181, a cluster management functionality or cluster management plane 191, and a cluster transport functionality or service 119 for the central office point of delivery cluster 118. The cluster control functionality or cluster control plane 181 is connected to the respective control functionality or control plane 180 of each of the central office points of delivery of the cluster 118, i.e. to the control functionality or control plane 180 of the first central office point of delivery 111, and to the control functionality or control plane 180 of the second central office point of delivery 112. Likewise, the cluster management functionality or cluster management plane 191 is connected to the respective management functionality or management plane 190 of each of the central office points of delivery of the cluster 118, i.e. to the management functionality or management plane 190 of the first central office point of delivery 111, and to the management functionality or management plane 190 of the second central office point of delivery 112. Likewise, the cluster transport functionality or service 119 is connected to the respective transport functionality or service 115 of each of the central office points of delivery of the cluster 118, i.e. to the transport functionality or service 115 of the first central office point of delivery 111, and to the transport functionality or service 115 of the second central office point of delivery 112. The cluster control functionality or cluster control plane 181 and the cluster management functionality or cluster management plane 191 are typically realized as proxy functions to orchestrate the aggregation of the individual control and management planes 180, 190 of the individual central office points of delivery (here: first and second central office point of delivery 111, 112) of the central office point of delivery cluster 118.

In FIG. 4, the central office point of delivery cluster 118 and the first and second access functionality 150', 150" are shown dual homed to the other central office point of delivery of the central office point of delivery cluster: I.e. the first access functionality 150' (being primarily associated or linked with the first central office point of delivery 111) is also connected to the second central office point of delivery 112 (cf. the dotted line from the first access functionality 150' to the second central office point of delivery 112), and the second access functionality 150" (being primarily associated with the second central office point of delivery 112) is also connected to the first central office point of delivery 111 (cf. the dotted line from the second access functionality 150" to the first central office point of delivery 111).

According to a preferred embodiment of the present invention, the central office point of delivery cluster 118, especially the cluster controller 195, provides for service orchestration involving both the first and the second central office point of delivery 111, 112 and/or for the sharing of special service edge nodes across at least the first and second central office point of delivery 111, 112. It is thereby especially possible to advantageously implement and realize services (or service instantiation) on the level of the central office point of delivery cluster 118 (i.e. typically located at the cluster controller 195) instead of on a central level of the telecommunications network 100 only. A centralized service deployment would locate services (such as, e.g., VPN (virtual private network) functionality and/or PBX (private branch exchange) functionality, ELAN (Ethernet virtual private LAN (local area network)), EVPN (Ethernet virtual private network)) on a central level, e.g. as part of the core network 101 of the telecommunications network 100, managed and/or controlled and/or instantiated especially by the service management system or function or functionality 103, i.e. on a central level within the telecommunications network 100. According to the present invention, it is advantageously possible to implement and/or to instantiate services on the level of the central office point of delivery cluster 118, i.e. the services are typically instantiated by the cluster controller 195, for all central office points of delivery (and their respective subscriber lines) of that cluster 118. Then, the central office point of delivery cluster controller 195 orchestrates service activation/deactivation, and this enables autonomous local service routing within the central office point of delivery cluster 118 without routing towards central service creation outside of the central office point of delivery cluster 118. By doing so, the service provider can guarantee its customer that traffic stays on net, i.e. within the central office point of delivery cluster 118—i.e. separated from a central routing within the telecommunications network 100. Hence, cluster-internal platform services are able to be easily implemented: In this case, a delegation from application specific service slices from the central parts of the telecommunications network 100 to the (central office point of delivery) cluster 118 advantageously enables network efficient hub and spoke architectures as well as low latency services by reducing network routing.

Figure 5:
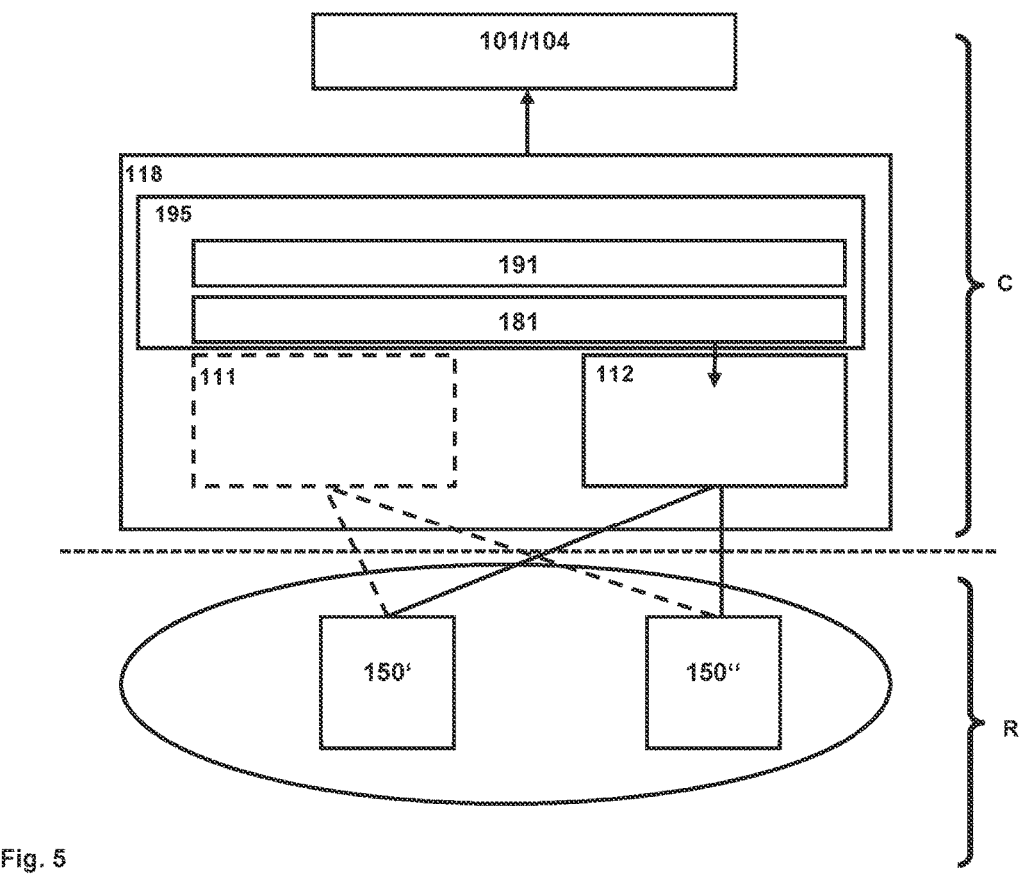
FIG. 5 schematically illustrates a central office point of delivery cluster according to the present invention.

In FIG. 5, the central office point of delivery cluster 118 according to the present invention is schematically shown, again comprising the first central office point of delivery 111, and the second central office point of delivery 112, the cluster controller 195 providing or comprising the cluster control functionality or cluster control plane 181, and the cluster management functionality or cluster management plane 191. The first and second access functionality 150', 150" are shown as dual homed to the other central office point of delivery of the central office point of delivery cluster: I.e. the first access functionality 150', associated or linked with the first central office point of delivery 111, is also connected to the second central office point of delivery 112, and the second access functionality 150", associated with the second central office point of delivery 112, is also connected to the first central office point of delivery 111. The access functionalities 150', 150" are typically located remotely (cf. reference sign R), and the central office point of delivery cluster 118 is centrally located (cf. reference sign C). In FIG. 5, the first central office point of delivery 111 as well as its connections to the first and second access functionality 150', 150" is represented in dashed lines and the second central office point of delivery 112 as well as its connections to the first and second access functionality 150', 150" is represented in drawn-through lines. In a first use scenario, both central office points of delivery 111, 112 are normally operational, and the first central office point of delivery 111 serves the subscribers of or connected to the first access functionality 150' and the second central office point of delivery 112 serves the subscribers of or connected to the second access functionality 150". This could be regarded as the start configuration or the normal configuration or use case, which means, that the (secondary) dual homing connections of the access functionalities 150', 150" to the central office points of delivery 111, 112 (i.e. the link of the first access functionality 150' to the second central office point of delivery 112, and the link of the second access functionality 150" to the first central office point of delivery 111) are only standby connections. In case that, e.g. for maintenance purposes or in case of failure, the second central office point of delivery 112 should take over the services provided by the first central office point of delivery 111, a dynamic handover is initiated and/or triggered by the cluster controller 195 such that the connections represented in dashed lines in FIG. 5 are only standby connection whereas the drawn-through lines correspond to the operative connections. Of course, also the inverted scenario is possible according to the present invention, i.e. that the first central office point of delivery 111 takes over the services provided by the second central office point of delivery 112, and a handover or dynamic handover is initiated and/or triggered by the cluster controller 195 such that the connections represented in dashed lines in FIG. 5 are the operative connections whereas the drawn-through lines correspond only to the standby connections. Hence, according to FIG. 5, as a prerequisite, the first and second central office point of delivery 111, 112 are activated, and access nodes are connected dual homed both to the first central office point of delivery 111, and the second central office point of delivery 112, the cluster controller 195 instantiates the first and second central office point of delivery 111, 112. In order to realize link resilience in a first use case, the cluster controller 195 steers activation and deactivation of a central office point of delivery (and/or configuration of the respective central office point of delivery). In order to implement a handover as a second use case, the cluster controller 195 steers handover, e.g. of the first central office point of delivery 111 to be maintained by the second central office point of delivery 112, or vice versa.

Figure 6:
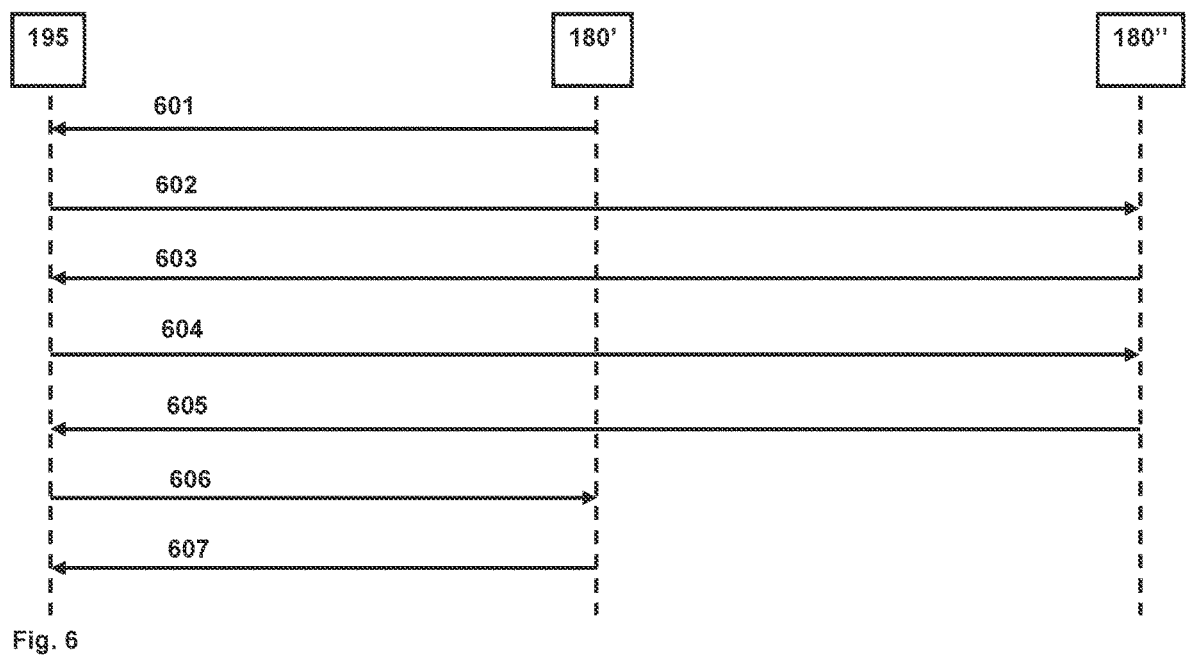
FIGS. 6, 7 and 8 schematically respectively show a communication diagram between entities of a central office point of delivery cluster.
Figure 7:
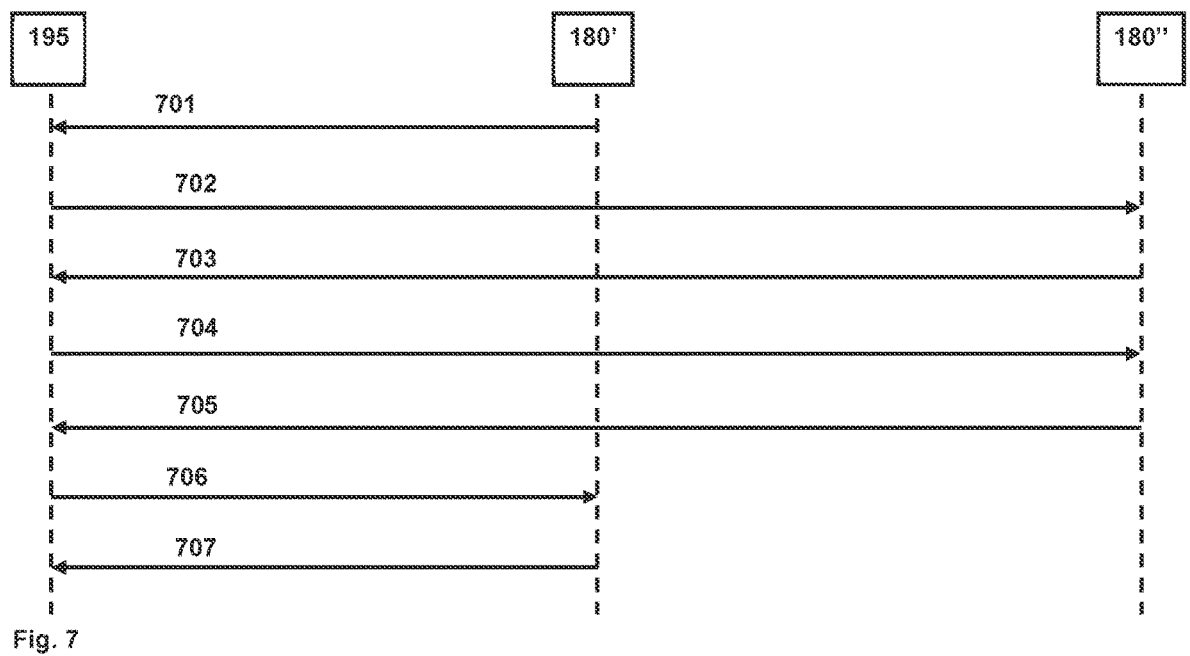
Figure 8:
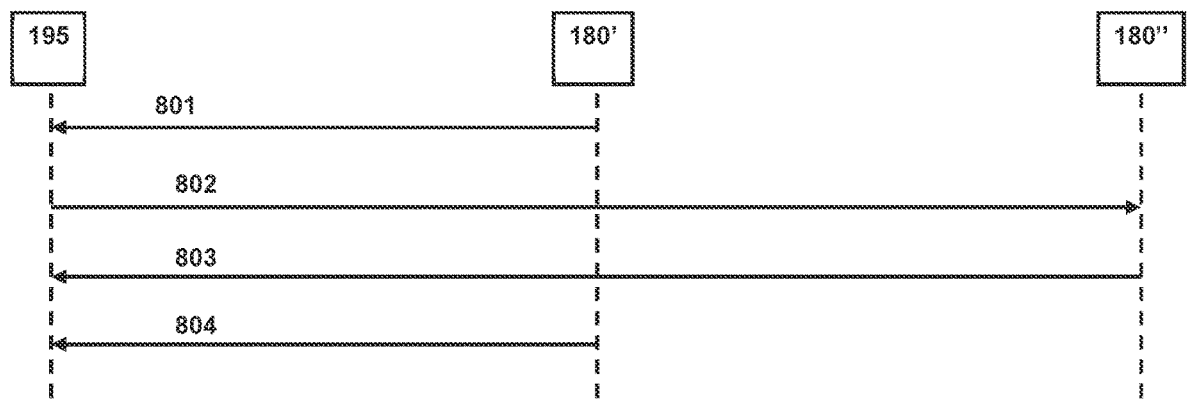

In FIGS. 6, 7 and 8, communication diagrams are shown between entities of a central office point of delivery cluster 118 (especially its cluster controller 195) and both the first control functionality or control plane 180' (of the first central office point of delivery 111), and the second control functionality or control plane 180" (of the second central office point of delivery 112).

FIG. 6 shows the situation realizing empty session and service session mirroring: In a first processing step 601, e.g. a failure of a link from the first central office point of delivery 111 to the first and access functionality 150', 150" is detected (and transmitted to the cluster controller 195); alternatively, the first central office point of delivery 111 is deliberately shut down, e.g. for maintenance reasons. In a second processing step 602, the cluster controller 195 requests the second central office point of delivery 112 to take over and/or to update its configuration regarding both the empty session state (of sessions being or having been operational with the first central office point of delivery 111) as well as the session state. In a third processing step 603, the update of the configuration is acknowledged by the second central office point of delivery 112, i.e. its second control functionality or control plane 180". In a fourth processing step 604, the (subscriber) links of the second central office point of delivery 112 to the first and access functionality 150', 150" are activated. In a fifth processing step 605, this activation is acknowledged by the by the second central office point of delivery 112, i.e. its second control functionality or control plane 180". In a sixth processing step 606, a request to shut down the (subscriber) link(s) between the first central office point of delivery 111 and the first and access functionality 150', 150" is transmitted to the first central office point of delivery 111 (or its first control functionality or control plane 180'). In a seventh processing step 607, this request is acknowledged by the first central office point of delivery 111 towards the cluster controller 195. According to the present invention, it is thereby advantageously possible to provide for increased resiliency due to service session mirroring using empty sessions and session states and thereby realize a seamless handover from the first central office point of delivery 111 to the second central office point of delivery 112.

FIG. 7 shows the situation realizing empty session mirroring only: In a first processing step 701, e.g. a failure of a link from the first central office point of delivery 111 to the first and access functionality 150', 150" is detected (and transmitted to the cluster controller 195); alternatively, the first central office point of delivery 111 is deliberately shut down, e.g. for maintenance reasons. In a second processing step 702, the cluster controller 195 requests the second central office point of delivery 112 to take over and/or to update its configuration regarding the empty session state only (of sessions being or having been operational with the first central office point of delivery 111). In a third processing step 703, the update of the configuration is acknowledged by the second central office point of delivery 112, i.e. its second control functionality or control plane 180". In a fourth processing step 704, the (subscriber) links of the second central office point of delivery 112 to the first and access functionality 150', 150'' are activated. In a fifth processing step 705, this activation is acknowledged by the by the second central office point of delivery 112, i.e. its second control functionality or control plane 180''. In a sixth processing step 706, a request to shut down the (subscriber) link(s) between the first central office point of delivery 111 and the first and access functionality 150', 150'' is transmitted to the first central office point of delivery 111 (or its first control functionality or control plane 180'). In a seventh processing step 707, this request is acknowledged by the first central office point of delivery 111 towards the cluster controller 195. According to the present invention, it is thereby advantageously possible to provide for increased resiliency due to service session mirroring using empty sessions; although (subscriber) sessions are interrupted (and redial-in is required), a comparatively seamless handover from the first central office point of delivery 111 to the second central office point of delivery 112 is possible.

FIG. 8 shows the situation of a maintenance situation where the first central office point of delivery 111 is replaced by the second central office point of delivery 112: In a first processing step 801, e.g. a request is transmitted by the cluster controller 195 to the first central office point of delivery 111 (i.e. its control functionality or control plane 180') to prepare to mirror to the second central office point of delivery 112. In a second processing step 802, the cluster controller 195 requests to the second central office point of delivery 112 (i.e. its second control functionality or control plane 180'') to take over and/or to update the first central office point of delivery 111 (central office point of delivery CD or database). In a third processing step 803, the takeover is acknowledged by the second central office point of delivery 112, i.e. its second control functionality or control plane 180''. In a fourth processing step 804, the takeover is completed or acknowledge (to the cluster controller 195) to be completed by the first central office point of delivery 111. Via using the central office point of delivery database, it is possible to hold or to preserve the session states and the customer (subscriber) configuration, and thereby provide a seamless handover or takeover by the second central office point of delivery 112.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operation of a broadband access network of a telecommunications network, comprising:
  in a first step, a first access functionality associated with a first central office point of delivery is connected to a second central office point of delivery, and a second access functionality associated with the second central office point of delivery is connected to the first central office point of delivery, wherein the first and second central office points of delivery are both part of a central office point of delivery cluster associated with a cluster controller providing a common control and transport plane for the first and second central office points of delivery; and
  in a second step, the cluster controller and both a first control functionality or control plane of the first central office point of delivery and a second control functionality or control plane of the second central office point of delivery control whether the first and second access functionalities are served by the first central office point of delivery or the second central office point of delivery;
  wherein each one of the first and second central office points of delivery comprises a respective switching fabric, wherein each respective switching fabric comprises a respective plurality of spine network nodes and a respective plurality of leaf network nodes, and wherein a respective leaf network node provides an edge functionality or service; and
  wherein the cluster controller provides for sharing of edge functionalities or services across the first and second central office points of delivery.

2. The method according to claim 1, wherein in the second step, the cluster controller and both the first control functionality or control plane and the second control functionality or control plane provide resiliency and/or load sharing related to the first access functionality and the second access functionality via steering activation and deactivation of sessions and/or ports related to respective access nodes or physical subscriber lines.

3. The method according to claim 1, wherein in the second step, the cluster controller and both the first control functionality or control plane and the second control functionality or control plane provide session and/or service session mirroring from the first central office point of delivery to the second central office point of delivery and/or vice versa.

4. The method according to claim 1, wherein in the second step, the cluster controller and both the first control functionality or control plane and the second control functionality or control plane provide dynamic handover of a subscriber session from the first central office point of delivery to the second central office point of delivery and/or vice versa.

5. The method according to claim 1, wherein in the second step, the cluster controller and both the first control functionality or control plane and the second control functionality or control plane provide for replacement of the first central office point of delivery with the second central office point of delivery or vice versa for performing maintenance operations.

6. The method according to claim 1, wherein the cluster controller of the central office point of delivery cluster acts as a centralized orchestrator controlling at least the first central office point of delivery and second central office point of delivery which are part of the central office point of delivery cluster, wherein the central office point of delivery cluster appears as one single instance of a central office point of delivery to centralized functionalities or network nodes of the telecommunications network, including a centralized management system thereof.

7. The method according to claim 1, wherein line termination nodes of a respective access functionality are connected, respectively, to at least two leaf network nodes of the plurality of leaf network nodes within a respective central office point of delivery.

8. The method according to claim 1, wherein the cluster controller provides for service orchestration involving both the first central office point of delivery and the second central office point of delivery.

9. A system for operation of a broadband access network of a telecommunications network, comprising:
- a plurality of central office points of delivery, including a first central office point of delivery and a second central office point of delivery, wherein each one of the first and second central office points of delivery comprises a respective switching fabric, wherein each respective switching fabric comprises a respective plurality of spine network nodes and a respective plurality of leaf network nodes, and wherein a respective leaf network node provide an edge functionality or service; and
- a cluster controller providing a common control and transport plane for the first and second central office points of delivery, wherein the first and second central office points of delivery are both part of a central office point of delivery cluster associated with the cluster controller
- wherein a first access functionality associated with the first central office point of delivery is connected to the second central office point of delivery, and a second access functionality associated with the second central office point of delivery is connected to the first central office point of delivery; and
- wherein the cluster controller and both a first control functionality or control plane of the first central office point of delivery and a second control functionality or control plane of the second central office point of delivery are configured to control whether the first and second access functionalities are served by the first central office point of delivery or the second central office point of delivery; and
- wherein the cluster controller is configured to provide for sharing of edge functionalities or services across the first and second central office points of delivery.

10. One or more non-transitory computer-readable mediums having processor-executable instructions stored thereon for operation of a broadband access network of a telecommunications network, wherein the processor-executable instructions, when executed, facilitate performance of the following steps:
- in a first step, connecting a first access functionality associated with a first central office point of delivery to a second central office point of delivery, and connecting a second access functionality associated with the second central office point of delivery to the first central office point of delivery, wherein the first and second central office points of delivery are both part of a central office point of delivery cluster associated with a cluster controller providing a common control and transport plane for the first and second central office points of delivery; and
- in a second step, controlling, by the cluster controller and both a first control functionality or control plane of the first central office point of delivery and a second control functionality or control plane of the second central office point of delivery, whether the first and second access functionalities are served by the first central office point of delivery or the second central office point of delivery;
- wherein each one of the first and second central office points of delivery comprises a respective switching fabric, wherein each respective switching fabric comprises a respective plurality of spine network nodes and a respective plurality of leaf network nodes, and wherein a respective leaf network node provides an edge functionality or service; and
- wherein the cluster controller provides for sharing of edge functionalities or services across the first and second central office points of delivery.

\* \* \* \* \*